(12) United States Patent
Kaemmer

(10) Patent No.: US 8,113,477 B2
(45) Date of Patent: Feb. 14, 2012

(54) HOLDER FOR A BEVERAGE CONTAINER

(75) Inventor: Hartwig Kaemmer, Waldachtal (DE)

(73) Assignee: Fischer Automotive Systems GmbH & Co. KG, Horb a.N. (DE)

( * ) Notice: Subject to any disclaimer, the term of this patent is extended or adjusted under 35 U.S.C. 154(b) by 76 days.

(21) Appl. No.: 12/692,828

(22) Filed: Jan. 25, 2010

(65) Prior Publication Data

US 2010/0200720 A1  Aug. 12, 2010

(30) Foreign Application Priority Data

Feb. 11, 2009  (DE) .......................... 10 2009 008 479

(51) Int. Cl.
*B60N 3/10* (2006.01)

(52) U.S. Cl. .................. 248/311.2; 248/314; 248/316.3; 224/926

(58) Field of Classification Search ............... 248/311.2, 248/309, 313, 314, 316.2, 316.3; 224/414, 224/926
See application file for complete search history.

(56) References Cited

U.S. PATENT DOCUMENTS

| | | | |
|---|---|---|---|
| 5,782,448 A * | 7/1998 | Withun et al. ............. | 248/311.2 |
| 5,839,711 A | 11/1998 | Bieck et al. | |
| 6,749,167 B2 | 6/2004 | Kaupp et al. | |
| 7,165,752 B2 | 1/2007 | Dobos | |
| 7,380,762 B2 * | 6/2008 | Takeichi ................... | 248/311.2 |
| 7,520,482 B2 | 4/2009 | Shin | |
| 7,597,300 B2 * | 10/2009 | Harada ..................... | 248/311.2 |
| 7,866,620 B2 * | 1/2011 | Kaemmer ................. | 248/311.2 |
| 2004/0021048 A1 | 2/2004 | Schaal | |
| 2004/0108428 A1 | 6/2004 | Leopold | |
| 2005/0279752 A1 * | 12/2005 | Harada ........................ | 220/759 |
| 2007/0075205 A1 | 4/2007 | Shin et al. | |
| 2009/0146035 A1 | 6/2009 | Kaemmer | |

FOREIGN PATENT DOCUMENTS

| | | |
|---|---|---|
| DE | 1 426 233 | 5/1970 |
| DE | 202 08 253 | 10/2003 |
| DE | 202 18 745 | 5/2004 |
| DE | 10 2005 044 358 | 4/2006 |
| DE | 10 2005 008 626 | 9/2006 |
| DE | 10 2005 056 613 | 5/2007 |
| EP | 0 800 954 | 10/1997 |
| EP | 1 258 391 | 11/2002 |
| EP | 2 077 203 | 7/2009 |

* cited by examiner

*Primary Examiner* — Anita M King
(74) *Attorney, Agent, or Firm* — Michael J. Striker

(57) ABSTRACT

A holder for a beverage container has a container receptacle for insertion of the beverage container, a holding jaw which is mounted so as to be movable a short distance into the container receptacle, and a spring element which urges the holding jaw into the container receptacle. The holder has a simple construction and is economical to produce, since the spring element, together with the holding jaw, is in the form of a mountable unit and the spring element consists of a synthetic material.

9 Claims, 3 Drawing Sheets

HOLDER FOR A BEVERAGE CONTAINER

CROSS-REFERENCE TO RELATED APPLICATION

The invention described and claimed hereinbelow is also described in German Patent Application DE 10 2009 008 479.7 filed on Feb. 11, 2009. This German Patent Application, whose subject matter is incorporated here by reference, provides the basis for a claim of priority of invention under 35 U.S.C. 119(a)-(d).

BACKGROUND OF THE INVENTION

The present invention relates to a holder for a beverage container.

The specification EP 800 954 A2 discloses a holder which is intended for installation in a vehicle. The known holder has a cylindrical container receptacle for insertion of the beverage container, the shape of the container receptacle not being essential to the invention. The envelope of the cylindrical container receptacle forms a wall in which there is movably mounted a holding jaw having a pivot bearing and/or linear bearing, the holding jaw being urged into the container receptacle by a spring element. On being inserted, the beverage container presses the holding jaw outwards against the spring force of the spring element. The spring element presses the holding jaw inwards against the periphery of the inserted beverage container and thus adapts the holder to the diameter of the beverage container. The spring element of the holder is produced in the form of a resilient band made of a synthetic elastomer material which encompasses the container receptacle and rests against the wall of the container receptacle and against the holding jaw.

A disadvantage of the known holder is that on account of the large number of individual parts, especially on account of the holding jaws and the resilient band, which has to be attached after the holding jaws have been mounted, it is relatively complicated to assemble and is expensive to produce.

SUMMARY OF THE INVENTION

The objective of the invention is therefore to propose a holder for a beverage container that is of simple construction and is economical to produce.

In keeping with these objects and which others which shall become apparent hereinafter, the present invention resides, briefly stated in a holder for a beverage container, comprising a container receptacle for insertion of the beverage container; a holding jaw mounted so as to be movable a short distance into said container receptacle; a spring element urging said holding jaw into said container element, wherein said spring element together with said holding jaw is in a form of a mountable unit and said spring element is composed of a synthetic material.

The holder according to the invention for a beverage container, having a container receptacle for insertion of the beverage container, comprises a holding jaw which is mounted in such a way that it is movable a short distance into the container receptacle. Mounting is affected, for example, using a pivot bearing and/or linear bearing. The container receptacle is typically of annular, cylindrical, tubular or cup-like construction, the envelope of the container receptacle, for example, forming a wall on which the holding jaw is arranged.

The holder according to the invention has, in addition, a spring element which urges the holding jaw into the container receptacle. A distinguishing feature of the holder according to the invention is that the spring element, together with the holding jaw, is in the form of a mountable unit and the spring element consists of a synthetic material.

By virtue of the arrangement according to the invention as a mountable unit in which the spring element is arranged on the holding jaw, the number of parts required for the final assembly of the holder according to the invention is significantly reduced. The holder is of simple construction and is therefore easy to assemble and economical to produce.

The spring element is preferably permanently joined to the holding jaw, so that it is ensured that the holding jaw, together with the spring element, can be produced in advance in the form of a mountable unit, optionally stored and transported for assembly of the holder, without the spring element's becoming detached from the holding jaw and without it being necessary for the assembly of these two parts of the mountable unit to be repeated. Furthermore, unlike a non-fixed connection, alignment of the holding jaw and the spring element with one another no longer needs to be performed.

In a preferred embodiment of the holder according to the invention, the spring element is in the form of a sickle-shaped arm. That is to say, the spring element curves into itself in such a way that its two ends have substantially the same orientation. For example, the ends point in the direction of the wall of the container receptacle. While one end of the arm is arranged on the holding jaw and is optionally permanently joined to the holding jaw, the second end can be supported on the outer side of the container receptacle and act upon the holding jaw with a spring force which presses the holding jaw into the container receptacle.

The magnitude of the spring force is dependent upon the amount by which the holding jaw is displaced. By virtue of the sickle-shaped form of the arm, a spring element can be produced in a simple way. An additional part or special shaping of the outer side of the container receptacle as counter-bearing for the spring element is accordingly unnecessary, so that the number of components of the holder can be minimised and the container receptacle of the holder can be of geometrically simple form.

A further preferred embodiment of the holder according to the invention has a holding jaw having an end stop for limiting the movement of the holding jaw. The end stop is advantageously permanently joined to the holding jaw, or formed integrally with the holding jaw. The end stop, like the spring element, is accordingly in the form of a mountable unit together with the holding jaw, so that the number of parts used for the final assembly of the holder is further reduced.

In a further preferred embodiment of the holder according to the invention, the bearing is a pivot bearing which has a knife-edge bearing for the pivotable mounting of the holding jaw. The knife-edge bearing has an edge, which is normally straight and is termed a knife edge. It defines the bearing axis. Such a construction enables the pivot axis of the pivot bearing to be arranged as close as possible to the inner side of the wall of the container receptacle of the holder, without any components or elements of the bearing projecting inwards beyond the inner side of the wall of the container receptacle where they could impede insertion of the beverage container into the container receptacle.

An arrangement of the pivot bearing as close as possible to the inner side of the wall is desirable because in that way a moment exerted on the holding jaw by a beverage container on being inserted into the container receptacle is at its greatest, which facilitates insertion. The moment exerted on the holding jaw by the beverage container on being inserted is directed outwards against the spring force of the spring element and presses the holding jaw outwards, so that the beverage container can be inserted into the container receptacle.

In a further preferred embodiment of the holder according to the invention, the spring element consists substantially of a soft, resilient synthetic material. By a suitable choice of the synthetic material it is ensured that the spring element has resilient properties, as a result of which it is able to act first as a spring and act upon the holding jaw with a restoring spring force. Suitable synthetic materials are, for example, silicone-based synthetic materials, such as silicone caoutchouc, or thermoplastic elastomers.

In a further preferred embodiment of the holder according to the invention, the spring element acts as a conductor of light. For that purpose, the spring element consists of a light-conducting synthetic material. By means of the spring element, light can accordingly be guided to the holding jaw or into the interior of the beverage container for the purpose of illumination. A further component, specifically for this purpose, is not necessary.

The holding jaw of the holder according to the invention preferably consists at least partly of a hard synthetic material, with "hard" meaning that the synthetic material, especially in comparison with the soft and resilient synthetic material of the spring element, is dimensionally stable and has little or no resilience. In this context, synthetic materials that are designated "hard" are, for example, polyamide (PA), poly-carbonate (PC) and acrylonitrile-butadiene-styrene (ABS). If the hard synthetic material is used in the regions which first make contact with the beverage container on insertion thereof and act as slide faces, it is ensured that the holding jaw moves outwards on insertion of the beverage container into the container receptacle.

A relatively soft synthetic material could become deformed on insertion of the beverage container, which could impede the movement of the holding jaw. It is also possible for regions made of a relatively soft synthetic material to be provided on the holding jaw. For example, the regions of the holding jaw that are in contact with the beverage container inserted into the container receptacle and act as holding faces are advantageously produced from a soft, resilient synthetic material, because the generation of noise by the beverage container making contact with the holding jaw is thereby prevented. For those holding regions it is possible to use, for example, the soft synthetic material of the spring element.

It is preferable for the spring element to be joined integrally to the holding jaw, especially by means of a bonded connection. For that purpose, the holding jaw is preferably produced with the spring element as a two-component injection-moulded part. In that way it is possible to produce the holding jaw with the spring element arranged thereon, and optionally with the end stop and the knife-edge bearing, complete as one component, the mountable unit. The holder according to the invention is accordingly simply constructed using a small number of components and is therefore easy to assemble and cost-effective to produce.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
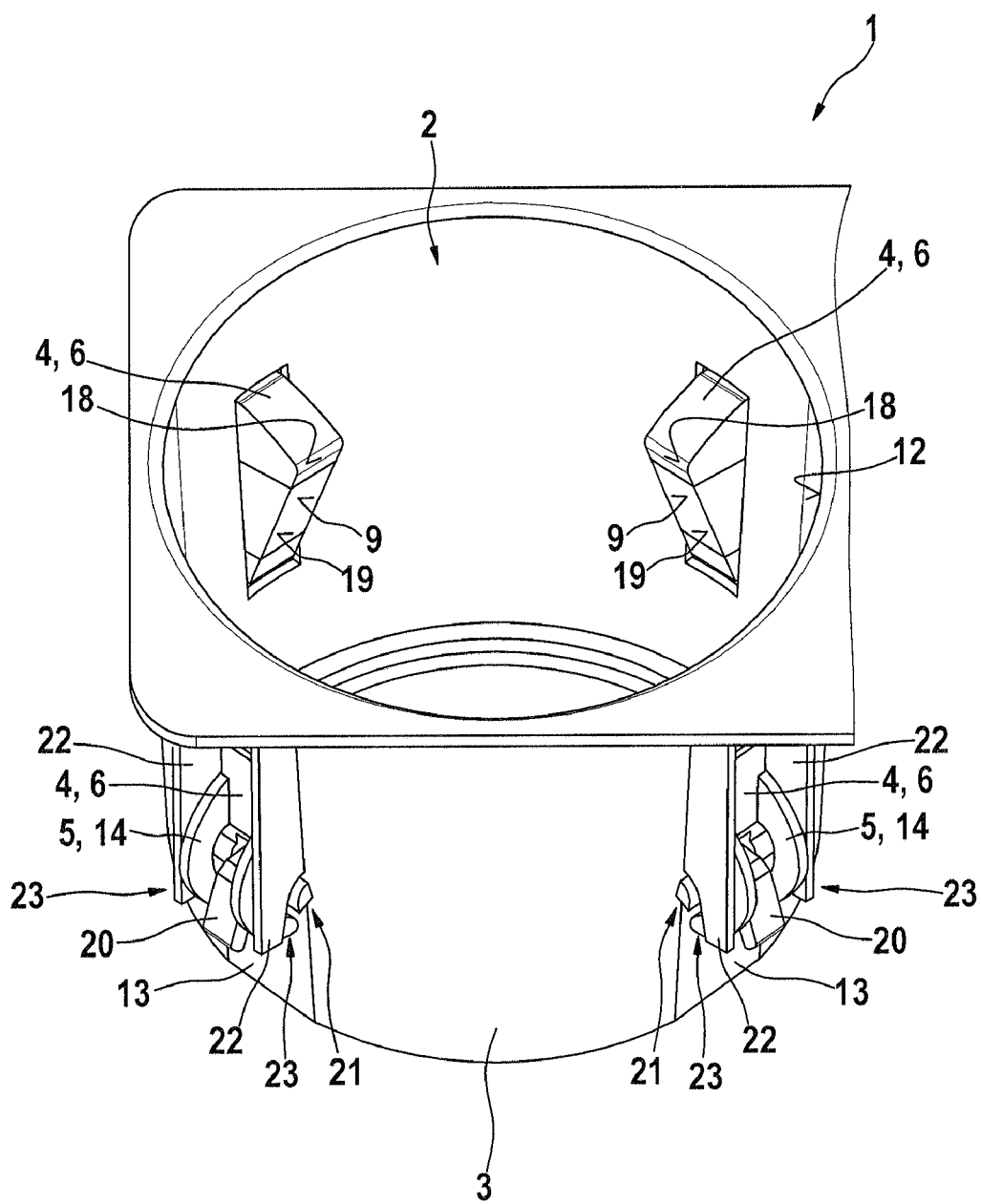
FIG. 1 is a perspective view of a holder according to the invention having a mountable unit formed from a spring element and a holding jaw.
Figure 2:
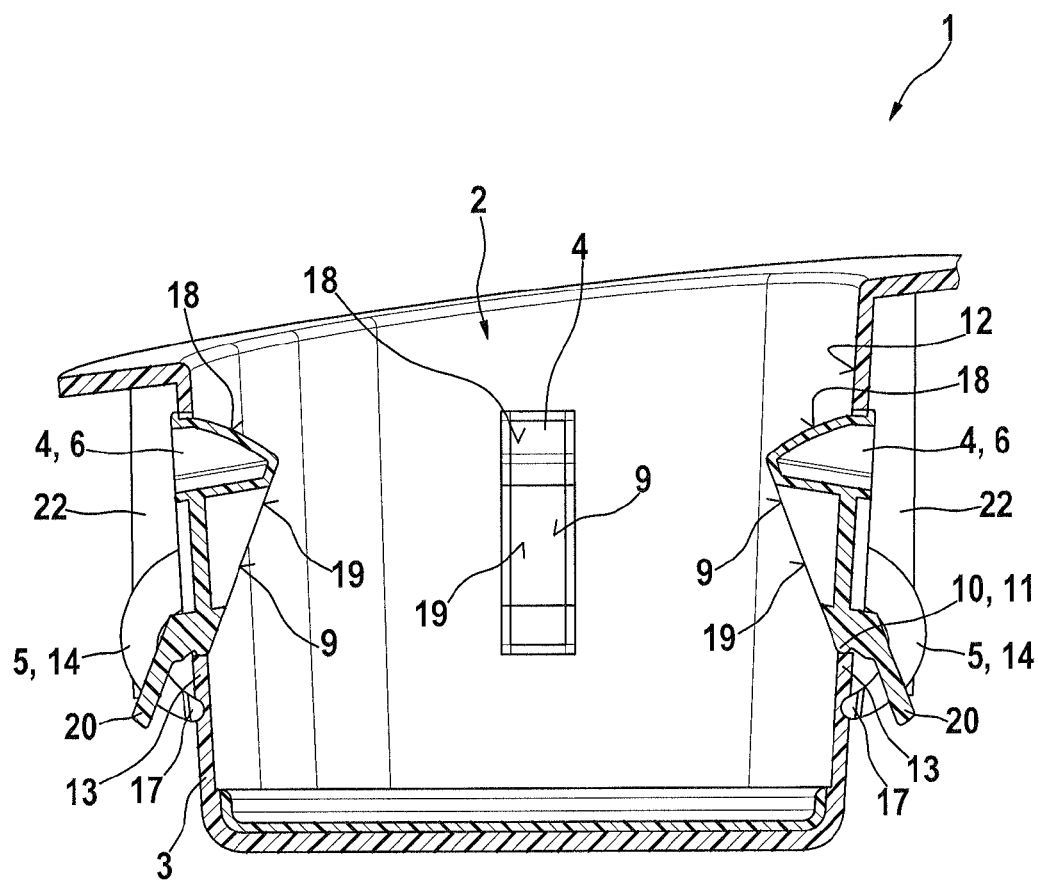
FIG. 2 is a sectional view of the holder according to the invention.

FIGS. 1 and 2 show a holder 1 according to the invention which is intended for installation in a vehicle (not shown). The holder 1 is used for insertion of a beverage container (not shown), such as, for example, a drinks can, a beaker, a cup or a bottle, and for holding the beverage container secure against tipping over. The holder 1 has a cylindrical container receptacle 2, open at the top, for insertion of the beverage container. The envelope of the cylindrical container receptacle 2 forms a wall 3 in which four spring-actuated holding jaws 4 are movably arranged.

The holding jaws 4 are arranged offset relative to one another by 90° in the circumferential direction. For receiving the holding jaws 4, the wall 3 has corresponding apertures. The holding jaws 4 are arranged in an upright position, that is to say in the typical installation position of the holder 1 in which the beverage container is inserted into the container receptacle 2 from above, they run from bottom to top.

Figure 3:
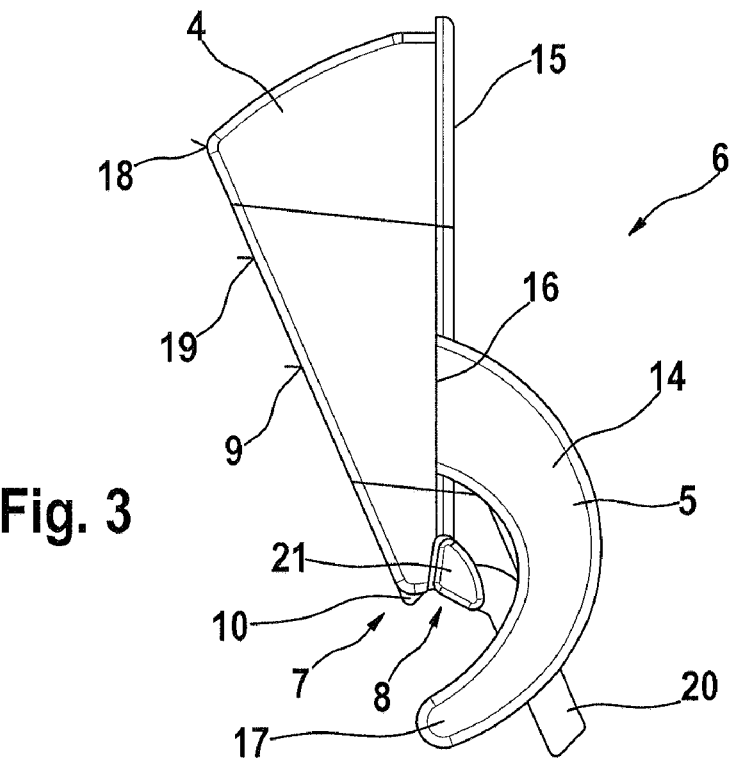
FIG. 3 is a side view of the mountable unit of the holder according to the invention.
Figure 4:
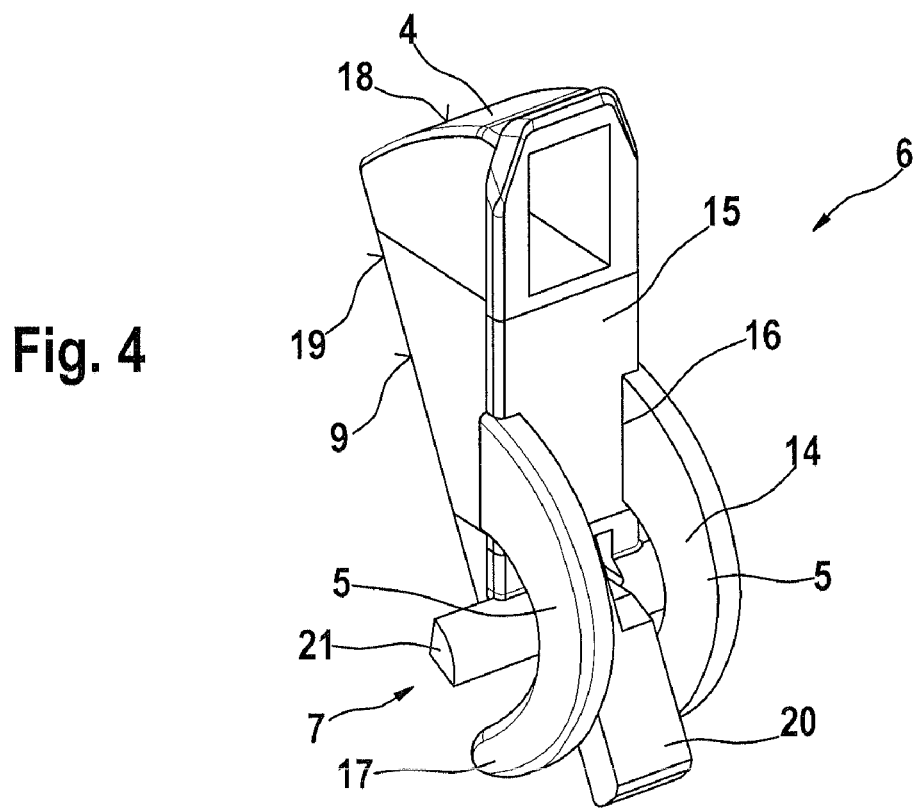
FIG. 4 is a perspective view of the mountable unit of the holder according to the invention.

Each mountable unit 6 is formed by a holding jaw 4, together with a spring element 5 which urges the holding jaw 4 into the container receptacle 2. The mountable unit 6 results in a simple structure of the holder 1, because only a small number of individual parts is necessary for assembling the holder 6, which simplifies assembly. The mountable unit 6 is shown separately in FIGS. 3 and 4. In side view (FIG. 3) the holding jaw 4 of the mountable unit 6 is wedge-shaped and, close to its lower end 7, has a step 8 by means of which it returns at the lower end of a contact face 9. The contact face 9 faces the interior of the container receptacle 2.

The step 8 has a bead 10 which is triangular in side view and the edge of which forms the knife edge of a knife-edge bearing 11. The edge of the bead 10 defines the pivot axis of the knife-edge bearing 11. It is located almost in the same plane as the contact face 9 and is arranged only a short way outwards relative to the inner face 12 of the wall 3 of the container receptacle 2. The edge or knife-edge of the bead 10 defining the pivot axis is in any case located inside the wall 3 of the container receptacle 2. The pivot axis runs tangentially with respect to the container receptacle 2.

The bead 10 of the holding jaw 4 is seated on the end face on the free end of a spring tongue 13 which projects from below into the aperture for the holding jaw 4 in the wall 3 of the container receptacle 2. The spring tongue 13 is located in the same plane as the wall 3. The bead 10 on the underside of the step 8 of the holding jaw 4 and the end face, i.e. the free end, of the spring tongue 13, on which the bead 10 is linearly seated, form the knife-edge bearing 11 about which the holding jaw 4 is pivotable.

On the holding jaw 4 there are arranged two sickle-shaped arms 14 which act as spring elements 5. The arms 14 are permanently joined to the holding jaw 4 in the lower third of the holding jaw 4, on the side 15 remote from the wall 3 of the container receptacle 2, in the region of the longitudinal edges of the holding jaw 4. The orientation of the arms 14, like that of the holding jaw 4, is from bottom to top, with a first, upper end 16 of the arms 14 being joined integrally to the holding jaw 4. The arms 14 have a second, lower end 17, the arms 14 being curved in a sickle shape in such a way that the second end 17, like the first end 16, is oriented in the direction of the wall 3 of the container receptacle 2.

The arms 14 acting as spring element 5 are produced from a soft, resilient synthetic material, a thermoplastic elastomer, which in addition has light-conducting properties. In contrast, the holding jaw 4 consists of a hard, non-light-conducting synthetic material, an ABS, the holding jaw 4 being partly surrounded by the soft synthetic material of the spring element 5. The hard synthetic material of the holding jaw 4, forms, in the region of the contact face 9, a slide face 18 which, on insertion of the beverage container, is first in contact with the beverage container. Because the slide face 18 is produced from a hard, virtually non-resilient synthetic material, the contact face 9 does not become deformed. The slide face 18 can readily slide on the outer wall of the beverage container; pivoting of the holding jaw 4 out of the container receptacle 2 is not impeded.

The soft synthetic material of the spring element 5 forms a holding face 19 on the contact face 9 of the holding jaw 4, which holding face is in contact with the beverage container in the inserted state. By the choice of a soft, resilient synthetic material, the holding face 19 has a damping action, so that no undesirable rattling noises are generated between the holding jaw 4 and a beverage container. Because the softer material additionally has light-conducting properties, the holding faces 19 can be illuminated, which makes the insertion of a beverage container in the dark significantly easier.

The spring element 5 and the holding jaw 4 are produced as a mountable unit 6 in one piece in the form of a two-component injection-moulded part, so that the spring element 5 is connected to the holding jaw 4 integrally and by means of a bonded connection. In addition, for the mounting of the mountable unit 6 on the holder 1, the mountable unit 6 comprises an end stop 20 and pins 21, which likewise consist of the hard synthetic material of the holding jaw 4 and are formed integrally with the holding jaw 4. The end stop 20 is a downwardly projecting plate that slopes away from the wall 3 of the container receptacle 2, which plate limits the pivoting movement of the holding jaw 4 by striking against the wall 3 when the holding jaw has pivoted the maximum amount out of the interior of the container receptacle 2.

The arms 14 acting as spring element 5 are supported below the holding jaw 4 on the outside of the wall 3 of the container receptacle 2 and press the holding jaw 4 inwards into the container receptacle 2. If a beverage container is inserted into the container receptacle 2, it strikes against the slide face 18 of the holding jaw 4 from above and exerts on the holding jaw 4 an outwardly directed moment which pivots the holding jaw 4 outwards against an arm 14 which rests against the wall 3 as a result of resilient deformation. The resilient arms 14 act as spring element 5 and generate a restoring force which urges the holding jaw 4 into the container receptacle 2. The outwardly directed moment exerted on the holding jaw 4 by the beverage container on insertion is the greater, the further the pivot axis of the knife-edge bearing 11, that is to say the edge of the bead 10, is located towards the inside, that is to say close to the inner face 12 of the wall 3.

The pins 21 arranged on the holding jaw 4 project outwards co-axially from the holding jaw 4 on respective sides and have in cross-section the shape of a segment of a circle. Ribs 22, which are integral with the wall 3 of the container receptacle 2, engage over the pins 21 on the outer sides thereof remote from the container receptacle 2. The ribs 22 are arranged on both sides of the holding jaw 4 and run in the longitudinal direction of the container receptacle 2. At their lower ends, at their foot facing the wall 3, the ribs 22 are provided with recesses, the recesses forming seatings 23 for the pins 21 of the holding jaw 4, which seatings are open at the bottom.

For mounting, the holding jaw 4 is moved into the aperture in the wall 3 from below along the outer side of the wall of the container receptacle 2, the contact face 9 pressing the spring tongue 13 resiliently inwards until the step 8 of the holding jaw 4 passes by the spring tongue 13. The spring tongue 13 snaps back so that the bead 10 on the underside of the step 8 is seated on the end face of the spring tongue 13. The ribs 22 engage over the pins 21 of the holding jaw 4 on the outer sides thereof and thus secure the holding jaw 4 in the aperture in the wall 3 and also ensure that the knife-edge bearing 11 is held together, that is to say that the bead 10 is seated on the end face of the spring tongue 13.

The arms 14 forming the spring element 5 are joined to the holding jaw 4 as a mountable unit 6 and need not be mounted separately. Because mounting takes place, as described, from below along the outer side of the wall 3 of the container receptacle 2, mounting of the holding jaw 4 is possible even if the holder 1 were to be of double-walled construction, making the wall 3 inaccessible from the outside.

The holder 1 according to the invention, by virtue of the construction of the mountable unit 6, which comprises the holding jaw 4, the spring element 5, the end stop 20 and the pins 21, consists of a small number of components. It is simply constructed, easy to assemble and accordingly cost-effective to produce.

It will be understood that each of the elements described above, or two or more together, may also find a useful application in other types of constructions differing from the types described above.

While the invention has been illustrated and described as embodied in a holder for a beverage container, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A holder for a beverage container, comprising a container receptacle for insertion of the beverage container; a holding jaw mounted so as to be movable a short distance into said container receptacle; a spring element urging said holding jaw into said container receptacle, wherein said spring element together with said holding jaw is in a form of a mountable unit and said spring element is composed of a synthetic material, wherein said spring element is formed as a sickle-shaped arm.

2. A holder for beverage container as defined in claim 1, wherein said spring element is permanently joined to said holding jaw.

3. A holder for a beverage container, comprising a container receptacle for insertion of the beverage container; a holding jaw mounted so as to be movable a short distance into said container receptacle; a spring element urging said holding jaw into said container receptacle, wherein said spring element together with said holding jaw is in a form of a mountable unit and said spring element is composed of a synthetic material; and a pivot bearing by which said holding jaw is mounted, said pivot bearing having a knife-edge bearing for the pivotable mounting of said holding jaw.

4. A holder for a beverage container, comprising a container receptacle for insertion of the beverage container; a holding jaw mounted so as to be movable a short distance into said container receptacle; a spring element urging said holding jaw into said container receptacle, wherein said spring element to together with said holding jaw is in a form of a mountable unit and said spring element is composed of a synthetic material, wherein said spring element is integrally joined to said holding jaw as one-piece.

5. A holder for a beverage container as defined in claim 4, wherein said holding jaw has an end stop for limiting the movement of said holding jaw.

6. A holder for a beverage container as defined in claim 4, wherein said spring element is composed of a soft, resilient synthetic material.

7. A holder for a beverage container as defined in claim 4, wherein said spring element is composed of a light-conducting synthetic material.

8. A holder for beverage container as defined in claim 4, wherein said holding jaw is composed at least partly of a hard synthetic material.

9. A holder for a beverage container as defined in claim 4, wherein said holding jaw and said spring element form together a two-component one-piece injection-molded part.

* * * * *